Oct. 29, 1968  P. BOSCH  3,407,738
CONTROL ARRANGEMENT FOR PUMPS
Filed Aug. 22, 1966  2 Sheets-Sheet 1
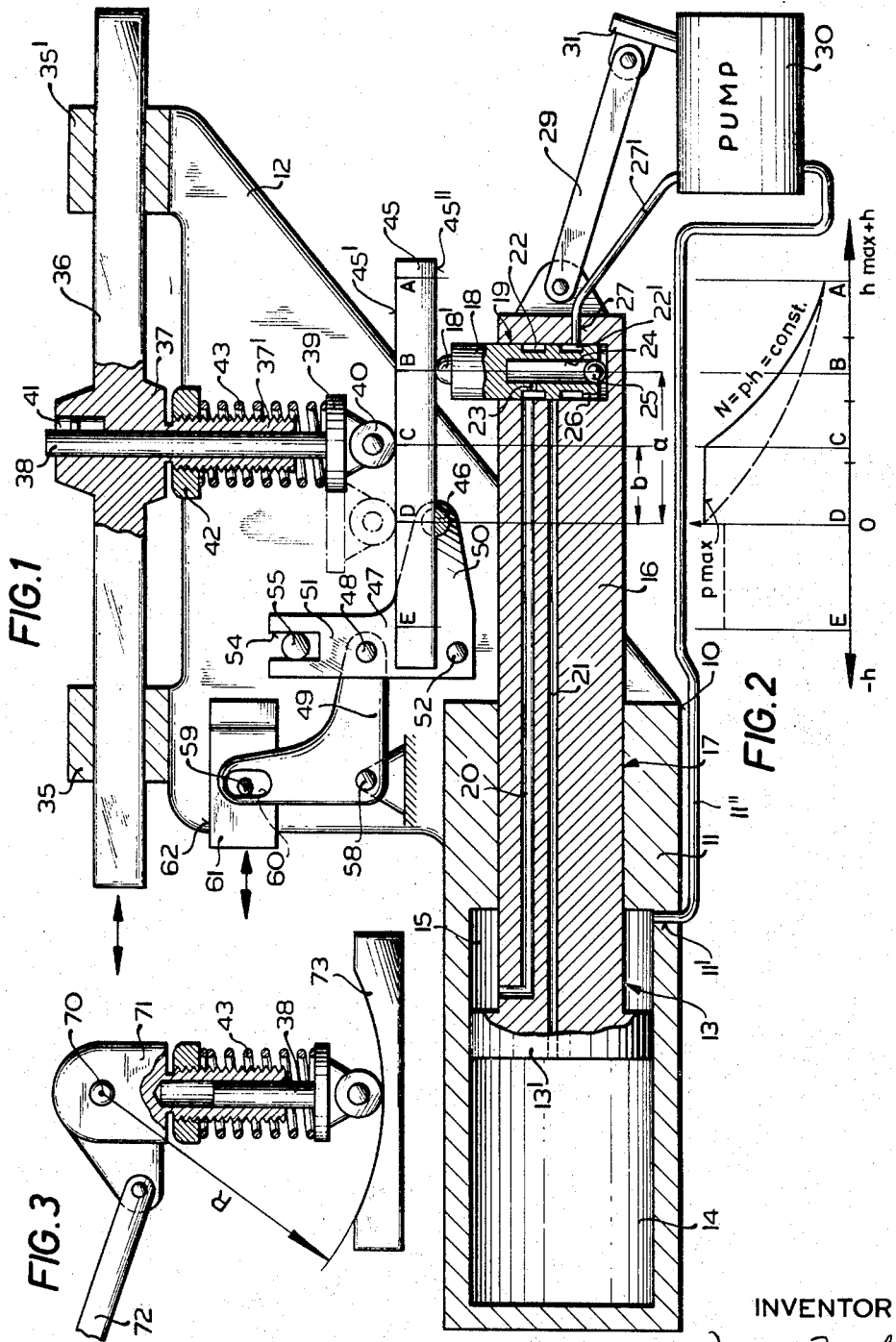
INVENTOR
Paul Bosch
by Michael S. Striker
Atty

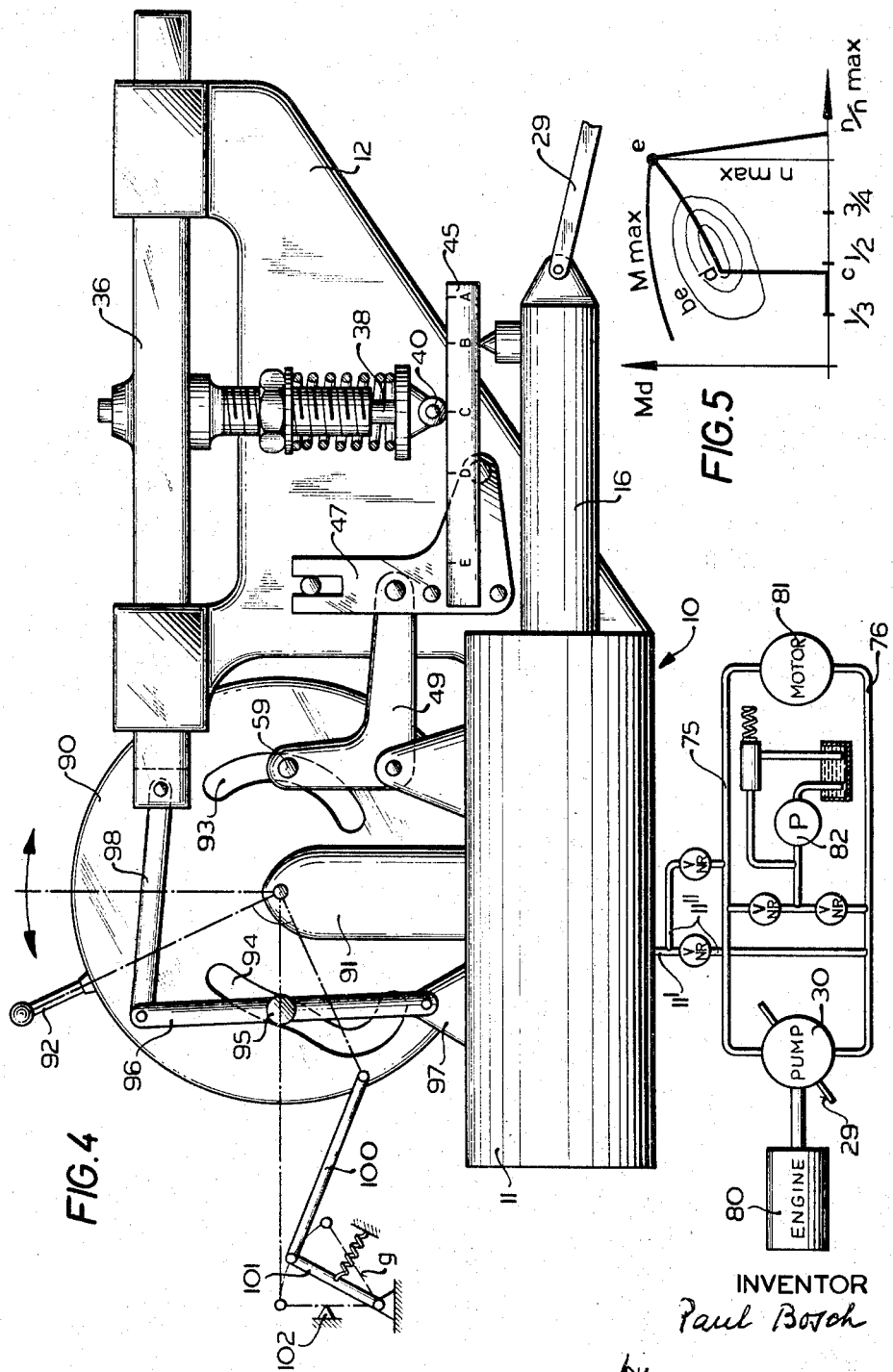

United States Patent Office 3,407,738
Patented Oct. 29, 1968

3,407,738
CONTROL ARRANGEMENT FOR PUMPS
Paul Bosch, Ludwigsburg, Germany, assignor to
Robert Bosch G.m.b.H., Stuttgart, Germany
Filed Aug. 22, 1966, Ser. No. 573,924
Claims priority, application Germany, Aug. 23, 1965,
B 83,391
16 Claims. (Cl. 103—17)

ABSTRACT OF THE DISCLOSURE

A control arrangement for an adjustable pump, and especially for an axial piston pump for a hydrostatic drive to produce a predetermined relation between the pressure of the fluid pumped by the pump and the stroke of the pump, especially to produce a constant product from the aforementioned values. Basically the control arrangement comprises tiltable balancing means by means of which the moments exerted by a force proportional to the pressure of the fluid delivered by the pump and that of an opposite substantially constant force are compared and by means of a regulating device brought into equilibrium, while the regulating device simultaneously controls and regulates the stroke of the pump.

---

Various control arrangements of the aforementioned type are known in the art for controlling operation of axial piston pumps, and especially for regulating the pump in such a manner that the product of the pressure of the fluid delivered by the pump and the pump stroke is maintained substantially constant.

The known control arrangements of the aforementioned kind are, however, relatively complicated and therefore expensive to produce, and in addition the known control arrangements are not suitable to control the pump with the desired exactness. In addition, the known control arrangements can serve only for controlling the pump in one way.

It is an object of the present invention to improve the control arrangements of the aforementioned kind known in the art.

It is a further object of the present invention to provide for a control arrangement of the aforementioned kind which permits to control and regulate the pump cooperating therewith in different ways.

It is an additional object of the present invention to provide for a control arrangement of the aforementioned kind which is relatively simple in construction so that the control arrangement may be produced at reasonable cost and will stand up trouble-free under extended use.

With these objects in view, the control arrangement according to the present invention mainly comprises support means, elongated balancing means, pivot means mounting said elongated balancing means tiltable about a pivot axis, first force producing means exerting a substantially constant force and engaging said elongated balancing means at a preselected distance from the pivot axis so as to produce a first moment tending to turn the balancing means in one direction about the pivot axis, second force producing means exerting a force depending on the pressure of the fluid delivered by the pump and engaging the balancing means so as to produce a second moment tending to turn the balancing means in the opposite direction, moving means controlled by the second force producing means for moving the point of engagement of the latter with said balancing means to change thereby the second moment produced by said second force producing means until said second moment is equal to said first moment, regulating means connected to said moving means and cooperating with the pump for regulating the stroke thereof in dependence on the position of the second force producing means along said balancing means in such a manner that the stroke decreases when the point of engagement of the second force producing means moves toward the pivot axis, and vice versa, mounting means on said support means and mounting said balancing means freely tiltable about the tilting axis as long as the point of engagemment of the second force producing means is spaced further from said tilting axis than the point of engagement of the first force producing means, and means cooperating with said mounting means to actuate, when the point of engagement of the second force producing means has been moved closer to said pivot axis than the point of engagement of said first force producing means, movement of said moving means without further increase of the pressure of the fluid delivered by the pump to a position in which said regulating means connected to said moving means reduces the stroke of the pump to a predetermined minimum.

The balancing means preferably comprises a two-armed lever tiltable about the aforementioned pivot axis, and the mounting means may include a coupling member carrying the pivot means, a crank lever mounted on the support means tiltable about a tilting axis and carrying on one arm thereof the coupling member pivotally connected thereto, and guide means cooperating with the coupling member for guiding the coupling member movably substantially normal to the elongation of the two-armed lever during tilting of the crank lever. A pair of spaced stop means are preferably provided on the coupling member through which one arm of the two-armed lever extends so that the stop means will limit tilting movement of the two-armed lever about the pivot axis thereof.

The arrangement may also include means for adjusting the point of engagement of said first force producing means with the two-armed lever in longitudinal direction of the latter whereby when the point of engagement of the first force producing means is adjusted to be located between the pivot axis of the two-armed lever and the stop means on the coupling member, the two-armed lever will be tilted about its pivot axis so that the one arm thereof will be held in engagement with one of the stop means on the coupling member whereby the manner of control of the pump by the control arrangement will be changed.

The arrangement may advantageously also include adjusting means for tilting the aforementioned crank lever about its tilting axis and for simultaneously adjusting the position of the point of engagement of the first force producing means with the two-armed lever, and this adjusting means may advantageously be connected to the fuel intake of an internal combustion engine driving the pump for regulating the fuel intake according to the load applied to the pump and to prevent stalling of the engine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a cross sectional view of one embodiment of a control arrangement according to the present invention for an axial piston pump;

FIG. 2 is a diagram showing a control characteristic curve;

FIG. 3 is a partial partially-sectioned view and showing a modification of part of the arrangement shown in FIG. 1;

FIG. 4 is a side view of an arrangement similar to that shown in FIG. 1 in which the arrangement is applied to a hydrostatic drive; and FIG. 5 is another diagram illustrating a motor characteristic curve.

Referring now to the drawings, and more specifically to FIG. 1, it will be seen that the control arrangement according to the present invention comprises support means 10 including a cylinder 11 and a bracket 12. A differential piston 13 which serves as force amplifier is closely guided in the cylinder 11. The large diameter portion 13' of the piston 13 separates in the interior of the cylinder 11 a pressure space 14 from a pressure space 15. A bore 11' through the wall of the cylinder 11 communicates with the pressure space 15 and the bore 11' is connected by means of a conduit 11'' with the high pressure side of an adjustable and reversible pump 30, only schematically illustrated in FIG. 1. The pump 30 may be connected to a hydraulic circuit as schematically illustrated in FIG. 4.

The small diameter piston part 16 of the differential piston 13 is guided in a bore 17 in the right end wall, as viewed in FIG. 1, of the cylinder 11 and carries at the end thereof projecting beyond the cylinder a control member or control piston 18 slidably guided in a bore 19 which extends substantially normal to the axis of the differential piston 13. A bore 20 extending in longitudinal direction through the piston part 16 provides communication between the bore 19 and the pressure space 15, and a second bore 21 likewise extending in axial direction through the piston part 16 provides communication between the bore 19 and the pressure space 14. The control piston 18 projects beyond the bore 19 and terminates at its upper end thereof in a gaging tip 18'. A pair of annular grooves 22 and 22' are formed axially spaced from each other in the peripheral surface of the control piston 18. A radial bore 23 provides communication between the annular groove 22 and axial blind bore 24 formed in the control piston. A ball 25 is slidably fitted in the lower open end of the bore 24 and the ball abuts against a portion of the piston 13 closing the bore 19 at the bottom thereof. A longitudinal groove 26 extends from the annular groove 22' up to the bottom surface of the control piston 18. A bore 27 communicates at the inner end thereof with the bore 19 and the outer end of the bore 27 is connected by means of a conduit 27' to a space of reduced pressure, for instance to the suction end of the pump 30 to be regulated, which may be an axial piston pump.

The pump is provided with a regulating member 31 which is connected by a link 29 to the right end, as viewed in FIG. 1, to the piston part 16 so that the position of the regulating member 13 will be adjusted during movement of the differential pistons 13.

When the control piston 18 is in the neutral position, as shown in FIG. 1, then the bore 20 communicates with the annular groove 22, whereas the annular portion of the control piston between the annular grooves 22 and 22' closes the right end, as viewed in FIG. 1, of the bore 21, and the bore 27 communicates with the annular groove 22'.

A pair of slide bearing 35 and 35' are arranged axially spaced from each other on the upper portion of the bracket 12 and a slide 36 is slidably guided in the bearing 35 and 35' for movement in a direction substantially parallel to the axis of the differential piston 13. A bearing 37 is formed substantially midway between the opposite ends of the slide 36 in which a bolt 38 is slidably guided for movement in a direction substantially normal to the elongation of the slide 36. The bolt 38 carries beneath a flange 39 formed at its bottom end a roller 40. A pin projecting laterally from the bolt 38 and guided in a groove 41 prevents the bolt 38 from turning about its axis. A tubular portion 37' provided with an outer screw thread projects coaxially with and downwardly from the bearing 37. A nut 42 is threadingly connected to the threaded outer surface of the tubular portion 37. A compression coil spring 43 is arranged between the bottom face of the nut 42 and the annular flange 39. The tension of the spring 43 may be adjusted by changing the position of the nut 42. The spring 43 presses the roller 40 turnably mounted on the bottom end of the bolt 38 against the upper face 45'' of a balancing means or lever 45. The bottom face 45'' of the lever 45 is pressed by the roller 40 against the gaging tip 18' of the control piston 18. The bottom face 45'' is fixedly secured to a pivot means in form of a pin 46 which is turnably mounted in the arm 50 of an L-shaped coupling member. The second arm 51 of the coupling member 47 extends substantially normal to the arm 50 away from the cylinder 11.

The pressing device comprising the members 38–40 constitutes together with the spring 43 first force producing means exerting a substantially constant force and engaging the elongated balancing means or the lever 45 to produce a first moment tending to turn the balancing means in one direction about the pivot axis, whereas the control piston 18 constitutes a second force producing means exerting a force depending on the pressure of the fluid delivered by the pump and engaging the balancing means so as to produce a second moment tending to turn the latter in the opposite direction.

The left arm, as viewed in FIG. 1, of the balancing means or double-armed lever 45, extends nearly to the left edge of the arm 51 and, in the position as shown in FIG. 1 in which the moments exerted by the first and second force producing means are equal, between and spaced from a pair of stop means in form of pins 48 and 52 fixedly secured to the coupling member 47. The pin 48 extends through the arm 51 and serves to pivotally connect the coupling member 47 to a crank lever 49. Guide means in form of a slot 54 in the upper end of the arm 51 of the coupling member 47 and a pin 55 secured to the bracket 12 and closely guided in the slot 54 are provided so that the coupling member 47 can move only in a direction substantially normal to the axis of the cylinder 11.

The crank lever 49 is turnably mounted on a pivot pin 58 secured to the bracket 12 and the upwardly directed arm of the crank lever 49 is provided with an elongated slot 60 into which a pin 59 fixed to a glide member 61 projects. The glide member 61 is slidably guided in a slot or groove 62 formed in the bracket 12 and may be fixed in any adjusted position by means not shown in the drawing. The width of the slot 60 is greater than the diameter of the pin 59.

To facilitate the following description of the operation of the device the following points are marked in the drawing on the balancing lever 45:

Point A in the region of the right end of the lever, as viewed in FIG. 1;

Point B located along the line in which the force produced by the control piston acts;

Point C located along the line in which the force of the spring 43 acts over the roller 40;

Point D along a line through the center of the pivot pin 46; and

Point E in the region of the left end of the lever 45.

The distance D–B is therefore the lever arm $a$ on which the force produced by the control piston 18 acts on the lever 45 and the distance D–C is the lever arm $b$ on which the spring force produced by the spring 43 acts.

FIG. 2 illustrates (assuming contant number of revolutions of the pump) an output diagram of the pump. The stroke $h$ of the pump is marked on the abscissa of the diagram and the pressure $p$ of the fluid pumped is marked on the ordinate of the diagram. The aforementioned points on the lever 45 are also marked in the diagram and the diagram is arranged in such a manner that the point D corresponds a stroke $h=0$, whereas the point A corresponds to the maximum stroke of the pump.

In the arrangement shown in FIG. 1, the position of the slide 36 and therewith the position of the roller 40 on the lever 45 may be chosen at will and the coupling member 47 can by means of the crank lever 49, via the glide member 61 be moved up and down.

In order to maintain a constant output of the adjustable pump 30 it is necessary to maintain the product of fluid pressure pumped by the pump and pump stroke constant. In the aforementioned output diagram (FIG. 2) the curve of constant output corresponds to a section of a hyperbola. It is therefore necessary that the control arrangement of the present invention changes, when one of the above values, for instance the fluid pressure, is changed, the other of the aforementioned values in proportion to the change of the one value.

In order to obtain this desired result the arrangement above-described will operate as follows:

The pressure of the fluid pumped by the pump 30 acts through the control piston 18 on the lever 45 which is turnable about the pivot pin 46. The force thus produced by the control piston 18 acts over the lever arm $a$ to produce a moment tending to turn the lever 45 in counterclockwise direction about the pivot pin 46 and this moment is opposed by the moment exerted by the spring 43 over the roller 40 and acting with the lever arm $b$ on the lever. If the two moments are equal, then the control piston 18 is in the neutral position, as shown in FIG. 1, and the system is at rest. If now for instance the pressure in the pressure conduit 11″ of the pump increases, then this increased pressure is transmitted through the bore 11′ into the pressure space 15 and passes through the bore 20 through the cylinder portion 16, the annular groove 22 in the control piston, and the radial bore 23, into the axial blind bore 24 of the control piston 18 so that the latter is raised. Thereby the annular groove 22′ will provide communication between the bore 21 through the portion 16 of the piston 13 and the bore 27, so that pressure fluid in the pressure space 14 can flow out from the latter through the bore 21, the annular groove 22′ and the bore 27 into the conduit 27′ which leads to the suction end of the pump. Due to the outflow of pressure fluid from the pressure space 14, the pressure fluid continuously fed into the pressure space 15 will move the piston 13 into the cylinder 11, that is the piston 13 will move towards the left, as viewed in FIG. 1. Thereby the adjusting member 31 of the pump 30 is moved by means of the link 29 in a direction in which the stroke of the pump and therewith the amount of fluid pumped by the latter is reduced.

Due to the movement of the piston 13 towards the left, the lever arm $a$ decreases as the force exerted by the control piston 18 increases. The movement of the piston 13 towards the left, as viewed in FIG. 1, will continue until the two moments are again equal, in which case the control piston will return to its neutral position as shown in FIG. 1 whereby the adjustment of the pump has been carried out as required, that is that the product of $p \times h$ is maintained constant, and the system is again at rest.

During further increase of the fluid pressure, the control piston 18 will approach the roller 40. When the control piston 18 is exactly beneath the roller 40, then the force exerted by the control piston 18 will be exactly equal to the force exerted by the spring 43 via the roller 40. If now the fluid pressure increases further slightly so that the force exerted by the control piston 18 is greater than the force exerted by the spring 43 via the roller 40, then the control piston lifts the lever 45 together with the coupling element 50 and during further movement of the control piston 18 towards the left, as viewed in FIG. 1, the lever 45 will also be turned until the left end thereof engages the pin 48 and until the pin 59 engages the right face of the groove 60 in the upwardly extending arm of the crank lever 49 whereas during movement of the control piston 18 between the points A and C of the lever 45 the pin 59 abutted against the left side of the slot 60. During movement of the control piston 18 between the points A and C the pump will be regulated for constant output.

When the control piston 18 has lifted the lever 45, then the differential piston 13 can move due to the play between pin 59 and groove 60 and due to the fact that during upward movement of the control piston 18 pressure fluid can continuously flow out from the pressure space 14, at constant pressure so far towards the left, as viewed in FIG. 1 until the control piston 18 arrives below the point D, that is when the engaging tip 18′ of the control piston substantially coincides with the axis of the pivot pin 46. This position of the piston 13 corresponds to a position in which the pump stroke is adjusted substantially to zero. This will protect the pump from overload. A zero stroke adjustment for the total control region between the points A and D at maximum pressure can be obtained when the slide 36 is brought to a position in which the roller 40 will engage the lever at the point A, whereby the above-described occurring operation between the points C and D will take place.

It is mentioned that with the described arrangement an adjustment of the pump to a zero stroke is not accomplished and also not desired, but it is desired to adjust the pump to a minimum stroke sufficient to pump enough fluid as is necessary for lubrication of the pump parts.

During decrease of the fluid pressure the force exerted by the spring 43 on the lever 45 will move the control piston 18 in downward direction in the bore 19 and the annular groove 22 in the control piston will thereby provide communication between the bores 20 and 21 so that pressure fluid from the pressure space 15 will flow into the pressure space 14 bordering on the surface of larger diameter of the differential piston 13 so that the latter is moved towards the right, as viewed in FIG. 1, whereby the stroke of the pump 30 is adjusted to a larger stroke.

When the slide 36 is adjusted in such a manner that the roller 40 will engage the lever 45 at the point E, then the lever 45 is turned about its pivot under the action of the forces applied thereagainst by the roller 40 and the control piston 18 in counterclockwise direction until the left end of the lever 45 will engage the pin 52 on the coupling member 47. By tilting of the crank lever 49, that is by adjusting the position of the glide member 61 in the slot 62, it is possible to move the lever 45, which is now in an inclined and in a fixed position relative to the member 50, held upwardly or downwardly. This permits to control the differential piston in any position thereof. The liquid pressure will lift the control piston 18, in the manner as described before, and the differential piston 13 is moved until the control piston 18 which slides with its tip 18′ on the bottom face 45″ of the lever 45 will be pushed back to its neutral position in which, as described before, pressure fluid cannot flow in or out from the pressure space 14. In this way one obtains a so-called follow-up control which is acting whether the pump feeds the fluid in one or the other direction.

The direction of feed of the pump is reversed when the control piston 18 moves along the portion of the lever 45 between points D and E. In this region it is however not possible any more to regulate the output of the pump but only the above mentioned follow-up control at any pump pressure can be obtained.

By changing the force produced by the spring 43 it is possible to vary the pump output, that is the product of fluid pressure and pump stroke within certain limits and through change of the position of the slide 36 between the points A and D it is possible to change the range of the output regulation.

Instead of the longitudinally adjustable slide 36 it is also possible to use for the adjustment of the position of the roller 40 a tiltable bolt, as shown in FIG. 3. In this arrangement the bolt 38 slides in the bore of a guide member 71 which is tiltably mounted on a pin 70 affixed to an extension of the bracket 12, not shown in FIG. 3, and the angular position of the member 71 may be changed by means of a link 72 only partly shown in FIG. 3. In this arrangement a member 73 is fixed to or forms part of the lever 45 and the member 73 has an upper curved surface with a radius of curvature R having its center at the axis of the pivot pin 70.

In the arrangement as shown in FIG. 1, as well as in the arrangement as shown in FIG. 3, the bolt 38 with the spring 43 may be replaced by a hydraulic cylinder and piston arrangement which is supplied with constant or variable fluid pressure from an auxiliary pump.

Adjustment of the positions of the slide 36 and the glide member 61 in the above-described arrangements are made independent from each other; however, it is also possible to provide for an arrangement in which the adjustments of the aforementioned components are carried out simultaneously and in a correlated manner. Such an arrangement is illustrated in FIG. 4.

The control arrangement illustrated in this figure serves for regulating of a pump of a hydrostatic drive. The overall arrangement is schematically illustrated in FIG. 4. Identical parts are referred to in FIG. 4 with the same reference numerals as in FIG. 1.

The reversible and adjustable pump 30 is driven by an internal combustion engine, for instance by a diesel motor 80. The pump pumps fluid through the conduits 75 and 76, which depending on the direction in which the fluid is pumped are respectively suction or pressure conduits, through a closed circuit to a hydraulic motor 81 which is a drive motor for driving for instance the wheels of a vehicle. An auxiliary pump 82 serves to compensate leakage losses within the hydraulic circuit. The additionally provided valves in this circuit are not referred to with reference numerals since the principle of the present invention is not influenced by the valves and since the valve arrangement schematically shown in FIG. 4 is well known.

The mechanism which controls the position of the slide 36 is schematically illustrated in FIG. 4. The mechanism comprises a control disk 90 turnably mounted on a bracket 91 for instance upwardly projecting from the cylinder 11. The control disk 90 can be turned by means of an operating lever 92 fixed to and projecting from the periphery of the disk 90. A pair of cam slots 93 and 94 are formed in the control disk 90 on opposite sides of the turning axis thereof. The upper part of the cam slot 93 is circular and has its axis at the turning axis of the disk, whereas the lower part of the cam slot 93 is in form of a spiral turning toward the center of the disk 90. The cam slot 93 is arranged on the side of the disk facing the bracket 12. A cam follower in form of a pin 59 is fixed to the upper arm of the crank lever 49 and extends with clearance in the cam slot 93 so that during turning of the control disk 90 in counterclockwise direction the crank lever 49 is turned due to engagement of the pin 59 with the spiral portion of the cam groove 93.

The cam slot 94 is arranged on the side of the control disk 90 facing away from the bracket 12 and the shape of this cam slot will be described later on. Slidingly arranged in the cam slot 94 is a cam follower in form of a pin 95 which is carried on a lever 96 pivotally connected at the lower end thereof to a bracket 97 projecting upwardly from the cylinder 11 and which is pivotally connected at the upper end thereof to a second lever or link 98 which in turn is pivotally connected to one end of the slide 36.

A control rod 100 is pivotally connected at one end thereof adjacent to the periphery of the control disk and on the side thereof on which the cam slot 94 is arranged. Preferably, the control rod 100 is connected to a point of the disk so that a line from the point of connection to the center of the disk includes an angle of 90 degrees with a line extending from the center of the disk to the operating lever 92. The end of the control rod 100 opposite to the end thereof which is pivotally connected to the disk 90 is pivotally connected to a control lever 101 which in turn is connected, by means of known construction and not shown in FIG. 4, to the regulator of the internal combustion engine 80, that is, when the engine is a diesel motor, to the regulator of the injection pump thereof. One end position of the control lever 101 indicated by the dotted line $g$ corresponds to an adjustment of the internal combustion engine for a maximum number of revolutions, respectively to a maximum fuel consumption of the combustion engine, whereas when the control lever 101 abuts against the stop 102 as indicated by the dash-dot line, then the fuel delivery to the engine is adjusted to zero. If, by a corresponding positive adjustment of the position of the slide 36, the maximum drive moment of the internal combustion engine is correlated to the adjusted number of revolutions thereof, then an optimum fuel consumption efficiency will be obtained at great as well as small loads applied to the engine. This coordinated positive adjustment of the position of the slide 36 is obtained by means of the coupling levers 96 and 98, the position of which is determined by the position of the cam follower 95 in the cam groove 94. The shape of the cam groove 94 is derived from the curve $cde$ of the motor characteristic shown in FIG. 5. The portions $de$ of the curve follows the line of the optimum specific fuel consumption. A stalling of the internal combustion engine is prevented by this arrangement since the adjusted drive moment of the pump is always smaller than the maximum moment of the drive engine. The vertical position of the operating lever 92 corresponds to the zero output of the pump 30. Turning the operating lever 92 towards the left, as viewed in FIG. 4, will result in a forward drive of the vehicle driven by the hydraulic motor 81. Depending on the size of the angle at which the lever 92 is turned from the zero position, the position of the roller 40 on the lever 45 will be changed between the points A and D and the control will proceed as described above. If the lever 92 is moved in counterclockwise direction from the zero position, the delivery direction of the pump will be reversed and the vehicle driven by the hydraulic motor 81 will move backwardly. In this range in which the roller 40 will assume a position between the points D and E on the lever 45 an output regulation will not occur as described above, but only a follow-up control.

Therefore, during "forward" drive, the combustion engine is adjusted for a selected output by means of the control lever 92 and the control disk 90 and the position of the roller 40 on the lever 45 is correspondingly adjusted. Depending on the load acting on the hydraulic motor of the drive, the control arrangement will regulate the pump 30 of the hydrostatic drive for a constant output.

For a "rearward" drive, such an output regulation is not necessary and the above-mentioned follow-up control for the pump is sufficient. The cam follower 59 moves thereby into the spiral region of the cam slot 93 and moves thereby the lever 45 by means of the crank lever 49 and the coupling member 47 to a greater or lesser extent.

By a different arrangement of the cam slots 93 and 94 with respect to each other or by disengagement it is possible to operate during the complete forward or rearward drive only with a follow-up control, and to drive for instance in a hydraulic motor 81 with a constant number of revolutions.

It will be understood that each of the elements described above, or two or more together, may also find a useful application in other types of control arrangements for pumps differing from the types described above.

While the invention has been illustrated and described as embodied in a control arrangement for a pump, it is not intended to be limited to the details shown, since various modifications and structural changes may be made without departing in any way from the spirit of the present invention.

What is claimed as new and desired to be secured by Letters Patent is:

1. A control arrangement for a pump comprising, in combination, support means; elongated balancing means; pivot means mounting said elongated balancing means tiltable about a pivot axis; first force producing means exerting a substantially constant force and engaging said elongated balancing means at a predetermined distance from said pivot axis so as to produce a first moment tending to turn said balancing means in one direction about said pivot axis; second force producing means exerting a force depending on the pressure of the fluid delivered by the pump and engaging said balancing means so as to produce a second moment tending to turn said balancing means in a direction opposite to said one direction; moving means controlled by said second force producing means for moving the point of engagement of the latter with said balancing means to change thereby said second moment produced by said second force producing means until said second moment is equal to said first moment; regulating means connected to said moving means and cooperating with said pump for regulating the stroke thereof in dependence on the position of said second force producing means along said balancing means in such a manner that the stroke decreases when the point of engagement of said second force producing means moves toward said pivot axis and vice versa; mounting means on said support and mounting said balancing means freely tiltable about said tilting axis as long as the point of engagement of said second force producing means is spaced further from said pivot axis than the point of engagement of said first force producing means; and means cooperating with said mounting means to actuate, when the point of engagement of said second force producing means has been moved closer to said pivot axis than the point of engagement of said first force producing means, movement of said moving means without further increase of the pressure of the fluid delivered by the pump to a position in which said regulating means connected to said moving means reduces the stroke of said pump to a predetermined minimum.

2. A control arrangement as set forth in claim 1 and including adjusting means for adjusting the position of the point of engagement of said first force producing means along said elongated balancing means.

3. A control arrangement as set forth in claim 2, wherein said elongated balancing means comprises a two-armed lever tiltable about said pivot axis, said first force producing means comprises spring means acting on one side of said lever, and said second force producing means comprises a control piston subjected to the pressure of the fluid pump by the pump and pressed against the opposite side of said lever.

4. A control arrangement as set forth in claim 3, wherein said moving means comprises a cylinder, a differential piston adapted to be subjected at opposite faces thereof to the pressure of the fluid produced by the pump, said piston being slidably guided in said cylinder and having an end portion projecting beyond the latter, said control piston being carried by said end portion of the differential piston movably substantially normal to the axis of the latter and controlling flow of pressure fluid to the respective face of the differential piston for moving the latter.

5. A control arrangement as set forth in claim 3, wherein said first force producing means includes further a pressure device biased by said spring means into engagement with said one side of said lever, and a slide mounted on said support means movable substantially parallel to said lever and carrying said pressure device.

6. A control arrangement as set forth in claim 5 and including means for adjusting the pressure exerted by said spring means on said pressure device.

7. A control arrangement as set forth in claim 1, wherein said mounting means comprises a coupling member carrying said pivot means, a crank lever mounted on said support means tiltable about a tilting axis and carrying on one arm thereof said coupling member pivotally connected thereto, and guide means cooperating with said coupling member for guiding said coupling member movably substantially normal to the elongation of said balancing means during tilting of said crank lever.

8. A control arrangement as set forth in claim 7, and including means connected to the other arm of said crank lever for tilting the latter about said tilting axis.

9. A control arrangement as set forth in claim 8, wherein said balancing means comprises a two-armed lever tiltable about said pivot axis and including a pair of spaced stop means on said coupling member, one arm of said lever extending between said pair of stop means so that the latter may limit tilting movement of said lever about said pivot axis.

10. A control arrangement as set forth in claim 9, wherein said means for tilting said crank lever about said tilting axis include a glide member mounted on said support means, and a pin and slot connection connecting said glide member with play to said crank lever.

11. A control arrangement as set forth in claim 1, wherein said elongated balancing means comprises a lever tiltable about said pivot axis, and wherein said first force producing means comprises a pressure device pivotally mounted at a point spaced from said lever on said support means, and spring means pressing said pressure device against a cylindrical face of said lever facing said point and having an axis passing through said point.

12. A control arrangement as set forth in claim 1, wherein said elongated balancing means comprises a two-armed lever tiltable about said pivot axis, wherein said first force producing means comprises a pressure device and spring means engaging said pressure device and pressing the latter against one side of said lever and including a slide mounted on said support means movably substantially parallel to said lever and carrying said pressure device for movement therewith and for movement in a direction substantially normal to said lever, and wherein said mounting means comprises a coupling member carrying said pivot means, a crank lever mounted on said support means tiltable about a tilting axis and carrying on one arm thereof said coupling member pivotally connected thereto, and guide means cooperating with said coupling member for guiding the latter movably substantially normal to the elongation of said lever during tilting of said crank lever, and a pair of spaced stop means carried on the coupling member through which one arm of the double armed lever extends; and including adjusting means cooperating with said slide and said crank lever for moving said slide in a direction substantially parallel to said lever and for simultaneously tilting said crank lever about its tilting axis.

13. A control arrangement as set forth in claim 12, wherein said adjusting means comprises a control disk turnably mounted on said support means and being formed with a pair of cam slots, a first cam follower carried by the other arm of the crank lever and extending into one of said cam slots, a second cam follower extending into the other cam slot, and linkage means connecting said second cam follower to said slide.

14. A control arrangement as set forth in claim 13, wherein said one cam slot has a circular portion concentric with the axis of the control disk and a second spiral cam portion curving toward said axis and wherein said first cam follower extends with clearance through said one cam slot.

15. A control arrangement as set forth in claim 13, and including an internal combustion engine for driving said pump, and additional linkage means connected to said control disk and cooperating with said engine for controlling the fuel intake of the latter.

16. A control arrangement as set forth in claim 15, in which said other cam slot is arranged and shaped to assure by control of the fuel intake of the engine an optimum fuel efficiency during operation of the latter.

References Cited

UNITED STATES PATENTS

| | | | |
|---|---|---|---|
| 2,283,321 | 5/1942 | Doe et al. | 103—1 |
| 2,661,701 | 12/1953 | Ferris | 103—162 |
| 2,931,176 | 4/1960 | Bloch et al. | 103—1 |
| 2,989,000 | 6/1961 | Alcaro | 103—16 |
| 2,971,498 | 2/1961 | Bloch | 103—162 |
| 3,003,309 | 10/1961 | Bowers et al. | 103—1 |
| 3,163,115 | 12/1964 | Neff et al. | 103—38 |

WILLIAM L. FREEH, *Primary Examiner.*